(12) United States Patent
Ngo et al.

(10) Patent No.: US 10,558,607 B2
(45) Date of Patent: Feb. 11, 2020

(54) BUS INTERFACE SYSTEM FOR POWER EXTRACTION

(71) Applicant: Qorvo US, Inc., Greensboro, NC (US)

(72) Inventors: Christopher Truong Ngo, Queen Creek, AZ (US); Praveen Varma Nadimpalli, Chandler, AZ (US); Alexander Wayne Hietala, Phoenix, AZ (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 15/886,209

(22) Filed: Feb. 1, 2018

(65) Prior Publication Data

US 2018/0217959 A1     Aug. 2, 2018

Related U.S. Application Data

(60) Provisional application No. 62/453,271, filed on Feb. 1, 2017.

(51) Int. Cl.
| *G06F 13/42* | (2006.01) |
| *G06F 1/18* | (2006.01) |
| *G06F 1/26* | (2006.01) |

(52) U.S. Cl.
CPC ............ *G06F 13/423* (2013.01); *G06F 1/182* (2013.01); *G06F 1/26* (2013.01)

(58) Field of Classification Search
CPC .... G06F 13/364; G06F 13/4072; G06F 13/40; G06F 13/4265
See application file for complete search history.

(56) References Cited

U.S. PATENT DOCUMENTS

| 3,953,835 | A | 4/1976 | Cuccio et al. |
| 5,787,132 | A | 7/1998 | Kishigami et al. |
| 6,408,163 | B1 | 6/2002 | Fik |
| 6,484,268 | B2 | 11/2002 | Tamura et al. |
| 7,685,320 | B1 | 3/2010 | Wishneusky |
| 9,430,321 | B2 | 8/2016 | Slik |
| 9,519,612 | B2 | 12/2016 | Hietala et al. |
| 9,652,431 | B2 * | 5/2017 | Asanghanwa ...... G06F 13/4265 |
| 10,185,683 | B2 * | 1/2019 | Ngo ................... G06F 13/3625 |
| 2001/0050713 | A1 | 12/2001 | Kubo et al. |
| 2004/0049619 | A1 | 3/2004 | Lin |

(Continued)

OTHER PUBLICATIONS

Non-Final Office Action for U.S. Appl. No. 14/575,491, dated May 26, 2017, 20 pages.

(Continued)

*Primary Examiner* — Brian T Misiura
(74) *Attorney, Agent, or Firm* — Withrow & Terranova, P.L.L.C.

(57) ABSTRACT

The present disclosure relates to a bus interface system including a bus line, master integrated circuitry (IC), and slave IC. The master IC is coupled to the bus line and configured to transmit the data signal to the slave IC through the bus line. The slave IC is coupled to the bus line so as to receive the data signal from the master IC and includes a supply capacitor, which is configured to store power from the data signal and provide a supply voltage to the slave IC. When the bus line is in the low state, the supply capacitor is isolated from the bus line. When the bus line is in the high state, the supply capacitor is allowed to extract power from the data signal on the bus line.

21 Claims, 6 Drawing Sheets

(56) References Cited

U.S. PATENT DOCUMENTS

| | | | |
|---|---|---|---|
| 2004/0100400 | A1 | 5/2004 | Perelman et al. |
| 2004/0128594 | A1 | 7/2004 | Elmhurst et al. |
| 2004/0221067 | A1 | 11/2004 | Huang et al. |
| 2005/0012492 | A1 | 1/2005 | Mihalka |
| 2006/0050694 | A1 | 3/2006 | Bury et al. |
| 2006/0152236 | A1 | 7/2006 | Kim |
| 2006/0236008 | A1 | 10/2006 | Asano et al. |
| 2009/0248932 | A1 | 10/2009 | Taylor et al. |
| 2011/0035632 | A1 | 2/2011 | Hong et al. |
| 2011/0113171 | A1 | 5/2011 | Radhakrishnan et al. |
| 2012/0027104 | A1 | 2/2012 | Bas et al. |
| 2012/0030753 | A1 | 2/2012 | Bas et al. |
| 2012/0226965 | A1 | 9/2012 | Hammerschmidt et al. |
| 2012/0303836 | A1 | 11/2012 | Ngo et al. |
| 2013/0054850 | A1 | 2/2013 | Co |
| 2013/0124763 | A1 | 5/2013 | Kessler |
| 2013/0132624 | A1 | 5/2013 | Chen et al. |
| 2013/0197920 | A1 | 8/2013 | Lesso et al. |
| 2013/0265884 | A1 | 10/2013 | Brombal et al. |
| 2013/0301689 | A1 | 11/2013 | Marchand et al. |
| 2014/0025999 | A1 | 1/2014 | Kessler |
| 2014/0376278 | A1 | 12/2014 | Fornage et al. |
| 2015/0056941 | A1 | 2/2015 | Lin et al. |
| 2015/0074306 | A1 | 3/2015 | Ayyagari et al. |
| 2015/0106541 | A1 | 4/2015 | Southcombe et al. |
| 2015/0127862 | A1 | 5/2015 | Fan et al. |
| 2015/0169482 | A1 | 6/2015 | Ngo et al. |
| 2015/0192974 | A1* | 7/2015 | Ngo .................... G06F 13/364 713/322 |
| 2015/0193297 | A1 | 7/2015 | Ngo et al. |
| 2015/0193298 | A1 | 7/2015 | Ngo et al. |
| 2015/0193321 | A1 | 7/2015 | Ngo et al. |
| 2015/0193373 | A1 | 7/2015 | Ngo et al. |
| 2016/0050513 | A1 | 2/2016 | Wang et al. |
| 2016/0124892 | A1 | 5/2016 | Amarilio et al. |
| 2017/0255250 | A1* | 9/2017 | Ngo .................... G06F 1/3287 |

OTHER PUBLICATIONS

Non-Final Office Action for U.S. Appl. No. 14/659,379, dated Apr. 7, 2017, 37 pages.
Author Unknown, "1-Wire," Wikipedia, last modified Jan. 16, 2015, accessed Feb. 12, 2015, http://en.wikipedia.org/wiki/1-Wire, 4 pages.
Author Unknown, "DS1822: Econo 1-Wire Digital Thermometer," Maxim Integrated, 2007, 21 pages.
Author Unknown, "MAXIM 1-Wire® Tutorial," MAXIM, online audiovisual presentation, 17 slides, No Date, accessed Feb. 12, 2015, http://www.maximintegrated.com/products/1-wire/flash/overview/ (38 images of slides).
Awtry, Dan, et al., "Design Guide v1.0," Springbok Digitronics, Aug. 19, 2004, 96 pages.
Non-Final Office Action for U.S. Appl. No. 14/575,491, dated Nov. 30, 2017, 18 pages.
Non-Final Office Action for U.S. Appl. No. 14/659,292, dated Sep. 29, 2017, 27 pages.
Final Office Action for U.S. Appl. No. 14/659,292, dated Apr. 30, 2018, 24 pages.
Non-Final Office Action for U.S. Appl. No. 14/659,328, dated Sep. 8, 2017, 51 pages.
Final Office Action for U.S. Appl. No. 14/659,328, dated Mar. 20, 2018, 61 pages.
Notice of Allowance for U.S. Appl. No. 14/659,328, dated Jul. 2, 2018, 8 pages.
Non-Final Office Action for U.S. Appl. No. 14/659,355, dated Sep. 20, 2017, 32 pages.
Final Office Action for U.S. Appl. No. 14/659,355, dated Apr. 17, 2018, 11 pages.
Advisory Action for U.S. Appl. No. 14/659,355, dated Jul. 5, 2018, 3 pages.
Non-Final Office Action for U.S. Appl. No. 15/467,790, dated Jun. 28, 2018, 14 pages.
Ex Parte Quayle Action for U.S. Appl. No. 15/365,315, mailed Jul. 26, 2018, 7 pages.
Final Office Action for U.S. Appl. No. 14/659,379, dated Oct. 18, 2017, 44 pages.
Advisory Action for U.S. Appl. No. 14/659,379, dated Feb. 26, 2018, 3 pages.
Notice of Allowance for U.S. Appl. No. 14/659,379, dated Mar. 20, 2018, 10 pages.
Non-Final Office Action for U.S. Appl. No. 14/659,371, dated Sep. 25, 2017, 23 pages.
Final Office Action for U.S. Appl. No. 14/659,371, dated May 3, 2018, 21 pages.
Advisory Action for U.S. Appl. No. 14/659,371, dated Aug. 1, 2018, 3 pages.
Notice of Allowance and Examiner-Initiated Interview Summary for U.S. Appl. No. 15/365,315, dated Sep. 14, 2018, 9 pages.
Notice of Allowance for U.S. Appl. No. 15/472,756, dated Aug. 8, 2018, 8 pages.
Non-Final Office Action for U.S. Appl. No. 14/659,371, dated Feb. 26, 2019, 22 pages.
Non-Final Office Action for U.S. Appl. No. 15/365,295, dated Mar. 29, 2019, 15 pages.
Advisory Action for U.S. Appl. No. 15/467,790, dated Feb. 26, 2019, 3 pages.
Non-Final Office Action for U.S. Appl. No. 14/659,292, dated Dec. 21, 2018, 23 pages.
Non-Final Office Action for U.S. Appl. No. 14/659,355, dated Oct. 12, 2018, 8 pages.
Final Office Action for U.S. Appl. No. 15/467,790, dated Nov. 5, 2018, 15 pages.
Non-Final Office Action for U.S. Appl. No. 15/443,236, dated Nov. 16, 2018, 19 pages.
U.S. Appl. No. 14/575,491, filed Dec. 18, 2014.
U.S. Appl. No. 14/659,292, filed Mar. 16, 2015.
U.S. Appl. No. 14/659,328, filed Mar. 16, 2015.
U.S. Appl. No. 14/659,355, filed Mar. 16, 2015.
U.S. Appl. No. 14/659,371, filed Mar. 16, 2015.
U.S. Appl. No. 14/659,379, filed Mar. 16, 2015.
U.S. Appl. No. 15/443,236, filed Feb. 27, 2017.
U.S. Appl. No. 15/365,295, filed Nov. 30, 2016.
U.S. Appl. No. 15/467,790, filed Mar. 23, 2017.
U.S. Appl. No. 15/472,756, filed Mar. 29, 2017.
Final Office Action for U.S. Appl. No. 14/659,292, dated Jun. 4, 2019, 24 pages.
Final Office Action for U.S. Appl. No. 14/659,355, dated May 2, 2019, 8 pages.
Notice of Allowance for U.S. Appl. No. 15/467,790, dated May 20, 2019, 8 pages.
Final Office Action for U.S. Appl. No. 15/443,236, dated May 30, 2019, 20 pages.
Final Office Action for U.S. Appl. No. 15/365,295, dated Aug. 15, 2019, 11 pages.
Corrected Notice of Allowance for U.S. Appl. No. 15/467,790, dated Aug. 15, 2019, 6 page.
Corrected Notice of Allowance for U.S. Appl. No. 15/467,790, dated Aug. 28, 2019, 6 pages.
Notice of Allowance for U.S. Appl. No. 15/443,236, dated Sep. 24, 2019, 8 pages.

* cited by examiner

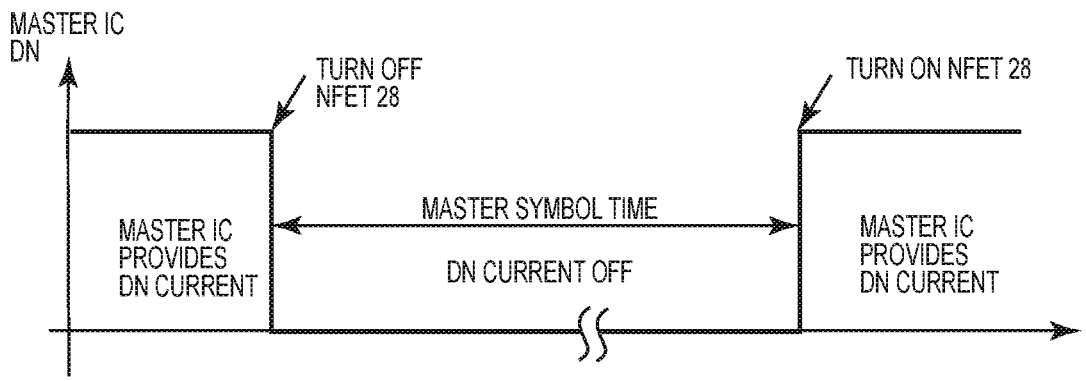
FIG. 2A
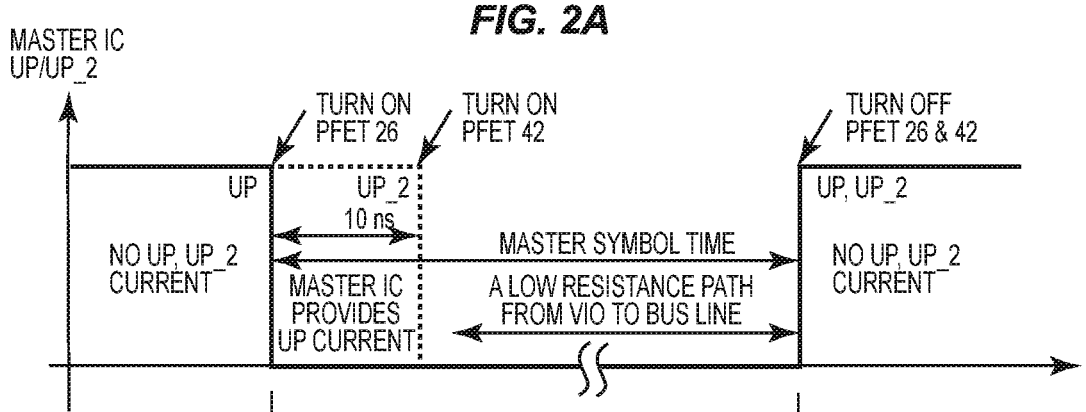
FIG. 2B
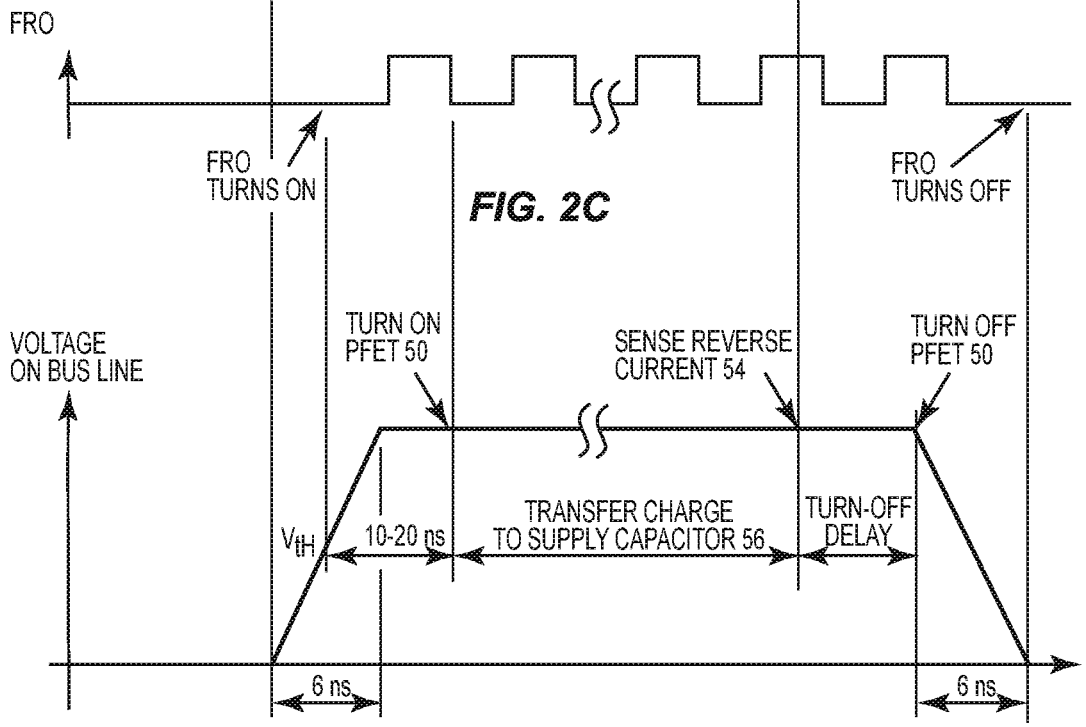
FIG. 2C
FIG. 2D

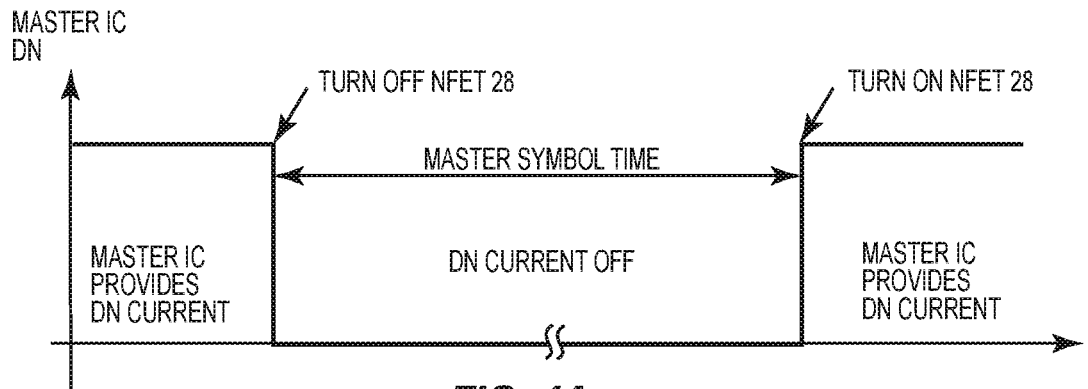
FIG. 4A
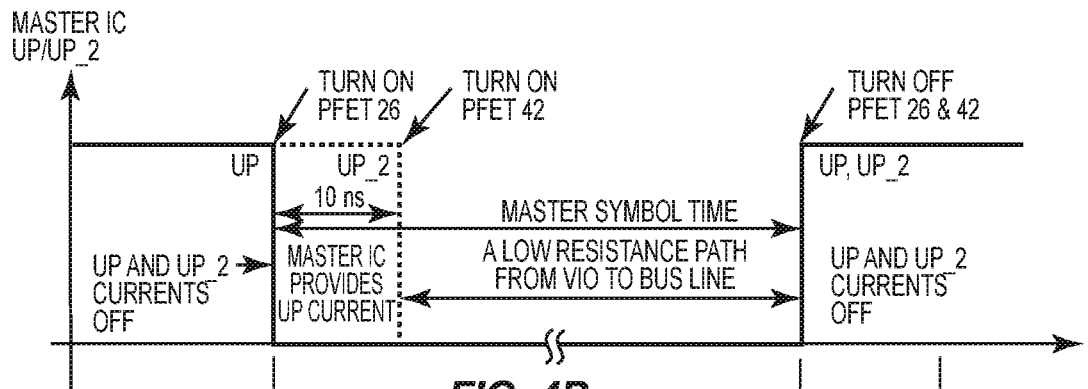
FIG. 4B
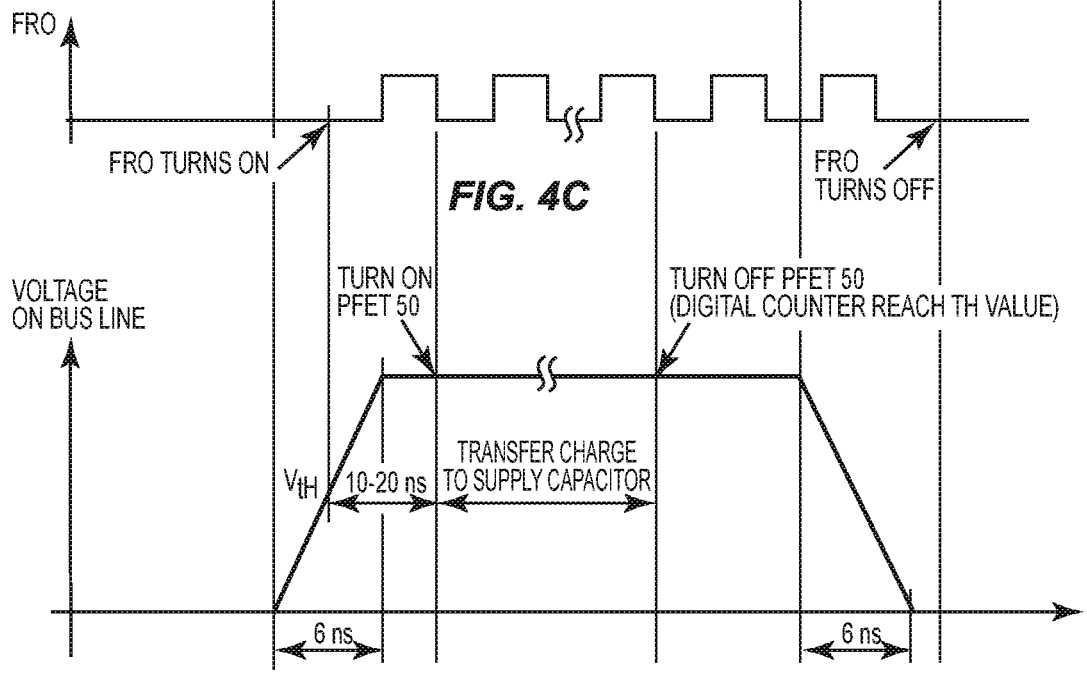
FIG. 4C
FIG. 4D

BUS INTERFACE SYSTEM FOR POWER EXTRACTION

RELATED APPLICATIONS

This application claims the benefit of provisional patent application Ser. No. 62/453,271, filed Feb. 1, 2017.

This application is related to the following applications: U.S. patent application Ser. No. 14/575,491, filed Dec. 18, 2014, and subsequently patented as U.S. Pat. No. 10,185,683 on Jan. 22, 2019, entitled "BUS INTERFACE SYSTEM"; and U.S. patent application Ser. No. 15/443,236, filed Feb. 27, 2017, published as U.S. Patent Application Publication No. 2017/0255250 on Sep. 7, 2017, entitled "SWITCHING POWER SUPPLY FOR SUBUS SLAVES."

All of the applications listed above are hereby incorporated herein by reference in their entireties.

FIELD OF THE DISCLOSURE

This disclosure relates generally to a digital bus interface system for power extraction.

BACKGROUND

A digital bus interface system is used to communicate data between components within an electronic device, such as a computer, a radio frequency (RF) front-end module, a cellular telephone, a tablet, a camera, and/or the like. The digital bus interface system generally includes at least one master integrated circuitry (IC) and one or more slave ICs. The master IC and the slave ICs are connected by bus lines and the master IC coordinates the transfer of data along the bus lines. The slave ICs perform commands (e.g., read and write commands) as coordinated by the master IC. Generally, the size of the digital bus interface system increases as more bus lines are provided in the digital bus interface system. The increase is due to the number of wires which must be routed between the master IC and slave ICs, and the number of pins for the master/slave ICs that must be dedicated to the bus lines. In modern communication systems, the space is at a premium and running multiple bus lines between a master IC and a slave IC may be spatially inefficient.

To reduce the number of bus lines, it is desirable to design a digital bus interface system that supplies power over a single bus line as well as communication. In addition, there is also a need to keep time efficiency and low noise level of the digital bus interface system.

SUMMARY

The present disclosure relates to a bus interface system, which includes a bus line, master integrated circuitry (IC), and slave IC. The bus line has a low state and a high state. The master IC is coupled to the bus line and configured to generate a data signal and transmit the data signal along the bus line. Herein, the data signal is a pulse width modulation (PWM) waveform having a high level and a low level. The bus line is in the high state when the data signal is at the high level, and the bus line is in the low state when the data signal is at the low level. The slave IC is coupled to the bus line so as to receive the data signal from the master IC and includes a supply capacitor to store power from the data signal on the bus line and provide a supply voltage to the slave IC. When the bus line is in the low state, the supply capacitor is isolated from the bus line. When the bus line is in the high state, the supply capacitor is allowed to extract power from the data signal on the bus line.

In one embodiment of the bus interface system, the slave IC further includes an edge detection circuit, a reverse current detection circuit, a digital control circuit, and a field effect transistor (FET). Herein, the edge detection circuit is coupled to the bus line and configured to provide an edge detection signal, which is based on a voltage level of the bus line, to the digital control circuit. The reverse current detection circuit is coupled to the bus line and configured to provide a current detection signal, which is based on current direction on the bus line, to the digital control circuit. The digital control circuit is configured to receive the edge detection signal and the current detection signal, and configured to provide a control signal to open or close the FET. And the FET is coupled to the supply capacitor and the bus line.

In one embodiment of the bus interface system, the FET is a p-type FET (PFET) with an ON channel resistance between 1 and 3 ohms.

In one embodiment of the bus interface system, when the bus line transitions from the low state to the high state, the digital control circuit utilizes the edge detection signal from the edge detection circuit to turn on the FET. And when the bus line transitions from the high state to the low state, the digital control circuit utilizes the current detection signal from the reverse current detection circuit to turn off the FET.

In one embodiment of the bus interface system, when the bus line is in the low state, the FET is open to isolate the supply capacitor from the bus line. And when the bus line is in the high state, the FET is closed to provide a charging path between the bus line and the supply capacitor.

In one embodiment of the bus interface system, the slave IC further includes at least one Electromagnetic interference (EMI) suppression capacitor, which is coupled in shunt with respect to the bus line to remove voltage spikes from the data signal on the bus line.

In one embodiment of the bus interface system, the at least one EMI suppression capacitor has a smaller capacitance than the supply capacitor.

In one embodiment of the bus interface system, the slave IC further includes a diode, wherein an anode of the diode is coupled to the bus line and a cathode of the diode is coupled to the supply capacitor.

In one embodiment of the bus interface system, the slave IC further includes an edge detection circuit, a digital control circuit, and a FET. Herein, the edge detection circuit is coupled to the bus line and configured to provide an edge detection signal, which is based on a voltage level of the bus line, to the digital control circuit. The digital control circuit includes a digital counter and a control block. The control block is configured to provide a control block signal that responds to a counting number of the digital counter. The digital control circuit is configured to provide a control signal to open or close the FET. The control signal is based on the edge detection signal and the control block signal. And the FET is coupled to the supply capacitor and the bus line.

In one embodiment of the bus interface system, when the bus line transitions from the low state to the high state, the digital control circuit utilizes the edge detection signal from the edge detection circuit to turn on the FET. When the counting number of the digital counter reaches a threshold, the digital control circuit utilizes the control block signal to turn off the FET.

In one embodiment of the bus interface system, the counting number of the digital counter reaches the threshold before the bus line transitions from the high state to the low state.

In one embodiment of the bus interface system, the slave IC further includes a reverse current detection circuit. Herein, the reverse current detection circuit is coupled to the bus line and configured to provide a current detection signal, which is based on current direction on the bus line, to the digital control circuit.

In one embodiment of the bus interface system, when the slave IC transitions from an idle mode to a telegram mode, the digital control circuit utilizes the current detection signal from the reverse current detection circuit to turn off the FET.

In one embodiment of the bus interface system, the slave IC further includes an auxiliary standby circuit, which is configured to provide an auxiliary path between the supply capacitor and the bus line.

In one embodiment of the bus interface system, when the slave IC is in a telegram mode, the digital control circuit is configured to activate the reverse current detection circuit and disable the auxiliary standby circuit. When the slave IC is in an idle mode, the digital control circuit is configured to disable the reverse current detection circuit and activate the auxiliary standby circuit.

In one embodiment of the bus interface system, the master IC comprises a data modulator and a switch circuit. Herein, the data modulator is coupled between a power supply and ground and configured to provide a first path from the power supply and the bus line. The switch circuit is coupled between the power supply and the bus line, and configured to form a second path between the power supply and the bus line. The second path has a lower impedance than the first path. A combination of the data modulator and the switch circuit is configured to provide the data signal to the bus line.

In one embodiment of the bus interface system, the master IC further includes at least one EMI suppression capacitor, which is coupled in shunt with respect to the bus line to remove voltage spikes from the data signal on the bus line.

In one embodiment of the bus interface system, the master IC further includes at least one shunt capacitor, which is coupled in shunt between the power supply and the data modulator to reduce ripple variations.

In one embodiment of the bus interface system, the switch circuit includes a FET. Herein, a drain of the FET and a source of the FET are coupled to the bus line and the power supply, respectively. The FET has an ON channel resistance between 0.2 and 0.5 ohms.

In one embodiment of the bus interface system, the master IC includes a data modulator. The data modulator is coupled between a power supply and ground and configured to provide the data signal to the bus line. A slew rate dV/dt on the bus line is constant, when the bus line transitions from the low state to the high state or when the bus line transitions from the high state to the low state.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 2A-2D illustrate timing diagrams of the bus interface system shown in FIG. 1.

FIGS. 4A-4D illustrate timing diagrams of the bus interface system shown in FIG. 3.

Figure 1:
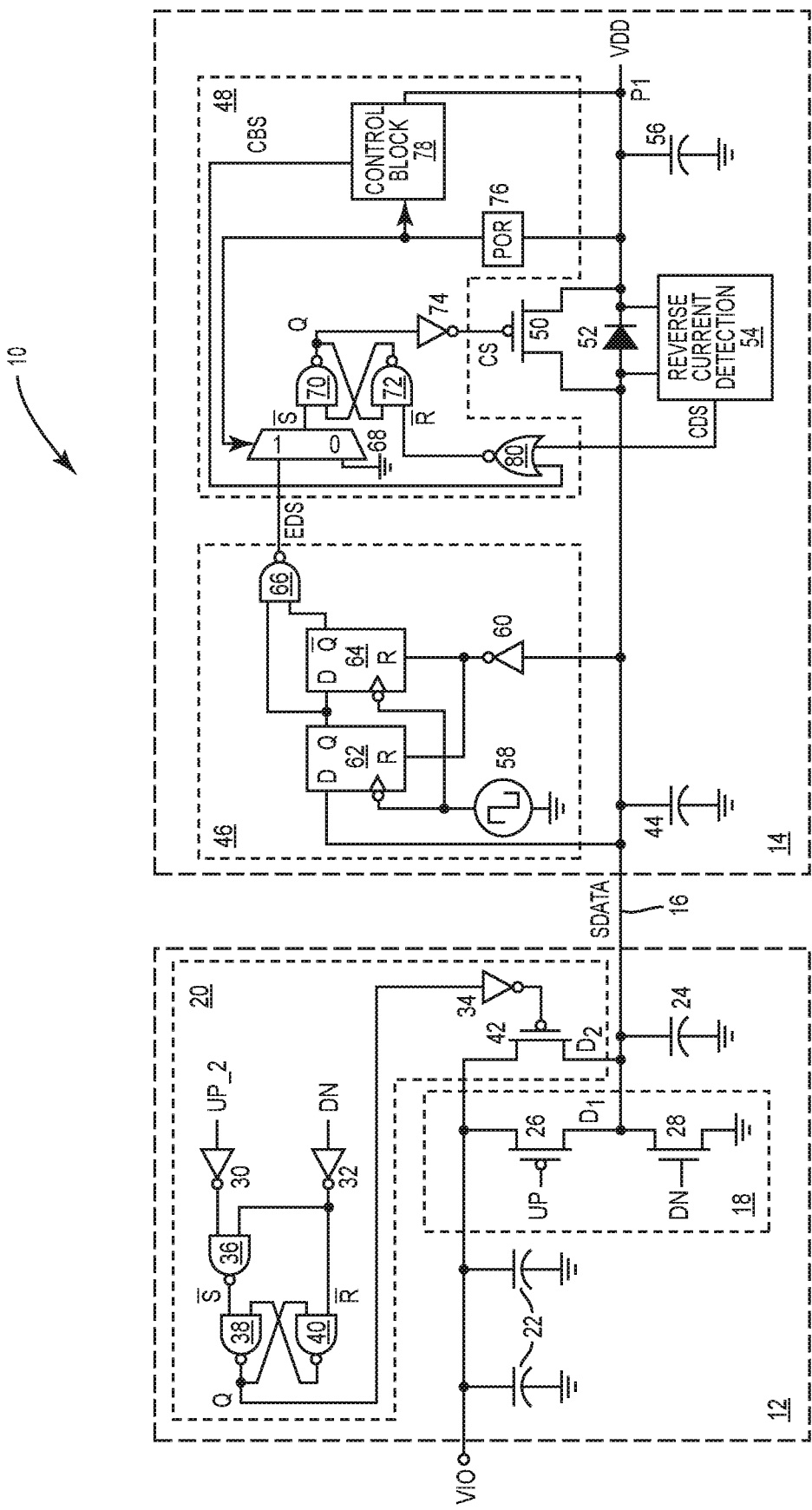
FIG. 1 illustrates an exemplary bus interface system according to one embodiment of the present disclosure.

It will be understood that for clear illustrations, FIGS. 1-6 may not be drawn to scale.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

FIG. 1 illustrates an exemplary bus interface system 10 according to one embodiment of the present disclosure. The bus interface system 10 includes master integrated circuitry (IC) 12, slave IC 14, and a bus line 16. The bus line 16 is configured to transmit data as well as charge between the master IC 12 and the slave IC 14.

In detail, the master IC 12 may include a data modulator 18, a switch circuit 20, one or more shunt capacitors 22, and one or more first electromagnetic interference (EMI) suppression capacitors 24. For simplicity and clarity, the master IC 12 does not show other circuits, such as a voltage regulation circuit, a read mode data receiver, and digital control circuitry. Herein, the data modulator 18 is coupled between a master power supply VIO and ground, configured to receive an UP input signal and a DN input signal, and configured to provide a first data signal D1 to the bus line 16. The switch circuit 20 is coupled between the master power supply VIO and the bus line 16, and configured to form a low-resistance (between 0.2 and 0.5 ohms) path between the master power supply VIO and the bus line 16. The switch circuit 20 is configured to receive an UP_2 input signal and the DN input signal, and configured to add a second data signal D2 to the bus line 16.

A combination of the data modulator 18 and the switch circuit 20 is configured to generate a combined data signal SDATA transmitted along the bus line 16. The combined data signal SDATA is a combination of the first data signal D1 and the second data signal D2. When the combined data signal SDATA is at a high level, the bus line 16 is at a high state. When the combined data signal SDATA is at a low level, the bus line 16 is at a low state. The combined data signal SDATA may be a pulse width modulation (PWM) waveform, and may define data pulses to represent different logical values (e.g. bit values, logical symbols). The shunt capacitors 22 are coupled in shunt between the master power supply VIO and the data modulator 18 to reduce ripple variations. The first EMI suppression capacitor 24 is coupled in shunt with respect to the bus line 16 to provide high frequency filtering that removes voltage spikes from the combined data signal SDATA. The capacitance of each shunt capacitor 22 may be between 1 of and 10 µf. The capacitance of the first EMI suppression capacitor 24 may be between 0 and 40 pf.

In one embodiment, the data modulator 18 may be formed by a first P-type field effect transistor (PFET) 26 and a first N-type FET (NFET) 28. The first PFET 26 and the first NFET 28 are coupled in series between the master power supply VIO and ground. A source of the first PFET 26 is coupled to the master power supply VIO, a gate of the first PFET 26 is configured to receive the UP input signal, and a drain of the first PFET 26 is coupled to a drain of the first NFET 28. A gate of the first NFET 28 is configured to receive the DN input signal, and a source of the first NFET 28 is coupled to ground. The bus line 16 is coupled to a joint point between the drain of the first PFET 26 and the drain of the first NFET 28, at which the first data signal D1 is provided. Herein, the first PFET 26 and the first NFET 28 are moderately sized FETs. A width of the first PFET 26 is between 480 and 550 µm, and a length of the first PFET 26 is between 0.3 and 0.4 µm. A width of the first NFET 28 is between 150 and 250 µm, and a length of the first NFET 28 is between 0.5 and 0.6 µm.

In addition, the switch circuit 20 may be formed by a first inverter 30, a second inverter 32, a third inverter 34, a first NAND gate 36, a second NAND gate 38, a third NAND gate 40, and a second PFET 42. Inputs of the first and second inverters 30 and 32 are configured to receive the UP_2 input signal and the DN input signal, respectively. Outputs of the first and the second inverters 30 and 32 are coupled to inputs of the first NAND gate 36. The second NAND gate 38 and the third NAND gate 40 form an SR latch, such that a first input of the second NAND gate 38 is an inverted S input of the SR latch, a first input of the third NAND gate 40 is an inverted R input of the SR latch, and an output of the second NAND gate 38 is a Q output of the SR latch. The inverted S input of the SR latch composed of the second and third NAND gates 38 and 40 is coupled to an output of the first NAND gate 36 and the inverted R input of the SR latch composed of the second and third NAND gates 38 and 40 is coupled to the output of the second inverter 32. The Q output of the SR latch composed of the second and third NAND gates 38 and 40 is coupled to a gate of the second PFET 42 through the third inverter 34. The master power supply VIO is coupled to a source of the second PFET 42, and the bus line 16 is coupled to a drain of the second PFET 42, at which the second data signal D2 is provided. Herein, the second PFET 42 is a large FET. A width of the second PFET 42 is between 8 and 12 mm, and a length of the second PFET 42 is between 0.15 and 0.2 µm. A low resistance path may be formed between the master power supply VIO to the bus line 16 through the second PFET 42 with a low ON channel resistance between 0.2 ohms and 0.5 ohms.

In the switch circuit 20, the second PFET 42 and the third inverter 34 may be replaced by a NFET, which is coupled between the master power supply VIO and the bus line 16 and configured to receive signals from the Q output of the SR latch composed of the second and third NAND gates 38 and 40. Further, in some applications, the switch circuit 20 is not included in the master IC 12, such that the combined data signal SDATA is based on the first data signal D1 from the data modulator 18.

The slave IC 14 may include one or more second EMI suppression capacitors 44, an edge detection circuit 46, a digital control circuit 48, a third PFET 50, a diode 52, a reverse current detection circuit 54, and a supply capacitor 56. For simplicity and clarity, the slave IC 14 does not show other circuits, such as an auxiliary charging path, a write mode data receiver, and a read mode bus driver.

The second EMI suppression capacitor 44 is coupled in shunt with respect to the bus line 16 to provide high frequency filtering that removes voltage spikes from the combined data signal SDATA. The edge detection circuit 46 is coupled to the bus line 16 and configured to provide an edge detection signal EDS to the digital control circuit 48. The edge detection signal EDS is based on a voltage level of the bus line 16. In other words, the edge detection signal EDS is based on the state of the bus line 16 (details in the following paragraphs). A source and a drain of the third PFET 50 are coupled to the bus line 16 and a slave supply port P1, respectively. An anode and a cathode of the diode 52 are coupled to the bus line 16 and the slave supply port P1, respectively. Two inputs of the reverse current detection circuit 54 are coupled to the bus line 16 and the slave supply port P1, respectively. The reverse current detection circuit 54 is configured to detect the current through the third PFET 50 and provide a current detection signal CDS to the digital control circuit 48.

The digital control circuit 48 is configured to generate a control signal CS, which is based on the edge detection signal EDS from the edge detection circuit 46 and the current detection signal CDS from the reverse current detection circuit 54, to turn on or turn off the third PFET 50. The supply capacitor 56 is coupled between the slave supply port P1 and ground, and allowed to store power from the combined data signal SDATA on the bus line 16. Herein, a slave supply voltage VDD is provided by the supply capacitor 56 at the slave supply port P1. The supply capacitor 56 may have a capacitance between 0.1 µf and 0.5 µf In one embodiment, the edge detection circuit 46 may be formed by a free running oscillator (FRO) 58, a fourth inverter 60, a first D type flip-flop (DFF) 62, a second DFF 64, and a fourth NAND gate 66. The FRO 58 is coupled to clock inputs of the first DFF 62 and the second DFF 64. An input of the fourth inverter 60 is coupled to the bus line 16, and an output of the fourth inverter 60 is coupled to reset inputs of the first DFF 62 and the second DFF 64. In addition, a D input of the first DFF 62 is coupled to the bus line 16, and a Q output of the first DFF 62 is coupled to both a D input of the second DFF 64 and a first input of the fourth NAND gate 66. An inverted Q output of the second DFF 64 is coupled to a second input of the fourth NAND gate 66. An output of the fourth NAND gate 66 provides the edge detection signal EDS to the digital control circuit 48.

In addition, the digital control circuit 48 may be formed by a first multiplexer (MUX) 68, a fifth NAND gate 70, a sixth NAND gate 72, a fifth inverter 74, a power-on-reset (POR) circuit 76, a control block 78, and a NOR gate 80. The first MUX 68 has a "1" input coupled to the output of the fourth NAND gate 66, a "0" input coupled to ground, and a switch control coupled to an output of the POR circuit 76. Further, the output of the POR circuit 76 is also coupled to the control block 78, and an input of the POR circuit 76 is coupled to the slave supply port P1. The control block 78 is coupled to the slave supply port P1, and configured to provide a control block signal CBS, which is based on signals from the POR circuit 76, to a first input of the NOR gate 80. A second input of the NOR gate 80 is configured to receive the current detection signal CDS from the reverse current detection circuit 54. The fifth NAND gate 70 and the sixth NAND gate 72 form an SR latch, such that a first input of the fifth NAND gate 70 is an inverted S input of the SR latch, a first input of the sixth NAND gate 72 is an inverted R input of the SR latch, and an output of the fifth NAND gate 70 is a Q output of the SR latch. The inverted S input of the SR latch composed of the fifth and sixth NAND gates 70 and 72 is coupled to an output of the first MUX 68 and the inverted R input of the SR latch composed of the fifth and sixth NAND gates 70 and 72 is coupled to an output of the NOR gate 80. The Q output of the SR latch composed of the fifth and sixth NAND gates 70 and 72 is coupled to the fifth inverter 74. The fifth inverter 74 is configured to provide the control signal CS to a gate of the third PFET 50. Herein, if the fifth inverter 74 is not included in the digital control circuit 48, the third PFET 50 may be replaced by an NFET, which is coupled between the bus line 16 and the slave supply port P1, and configured to receive signals from the Q output of the SR latch composed of the fifth and sixth NAND gates 70 and 72.

FIGS. 2A-2D illustrate timing diagrams of the bus interface system 10 shown in FIG. 1 within a telegram. At any time, in which the bus line 16 transitions from a low state into a high state within a telegram, the master IC 12 will set the DN input signal low to turn off the first NFET 28 and will set the UP input signal low to turn on the first PFET 26. The first EMI suppression capacitor 24 in the master IC 12 and the second EMI suppression capacitor 44 in the slave IC 14 will then linearly ramp up based upon the current provided by the first PFET 26 and the total capacitance of the first and second EMI suppression capacitors 24 and 44. In one embodiment, the target rise time is 6 ns, the total capacitance of the first and second EMI suppression capacitors 24 and 44 is 40 pf, and the programmed current of the first PFET 26 is 13.5 mA.

The master IC 12 will then set the UP_2 input signal low after a time delay, which may be approximately 10 ns. This low UP_2 input signal will set the SR latch composed of the second and third NAND gates 38 and 40, such that the Q output of the SR latch composed of the second and third NAND gates 38 and 40 is high. The third inverter 34 will then drive the gate of the second PFET 42 low to turn on the second PFET 42, so that a low impedance path is formed from the master power supply VIO to the bus line 16. The second PFET 42 has a low ON channel resistance, which may be between 0.2 and 0.5 ohms. It is important that the UP_2 input signal is set low before the third PFET 50 in the slave IC 14 turns on. If the third PFET 50 turns on before the UP_2 input signal turns low, then the rising waveform may be distorted.

When the bus line 16 moves from a high state to a low state, the master IC 12 will set the DN input signal, the UP input signal and the UP_2 input signal back to high. When the DN input signal goes high, the second inverter 32 will go low and reset the SR latch composed of the second and third NAND gates 38 and 40, such that the Q output of the SR latch composed of the second and third NAND gates 38 and 40 will go low. This causes the third inverter 34 to go high and thus turn off the second PFET 42. In addition, when the UP input signal goes high, the first PFET 26 will be turned off. Consequently, the bus line 16 is released from the master power supply VIO.

At the same time, when the DN input goes high, the first NFET 28 is turned on to provide a controlled down current from the bus line 16 to ground. The voltage of on the bus line 16 will not fall at first, because the third PFET 50 of the slave IC 14 is still active and will hold the bus line 16 at the voltage level of the supply capacitor 56. After a few nanoseconds (due to the response time of the reverse current detection circuit 54), the reverse current detection circuit 54 of the slave IC 14 will turn off the third PFET 50 and disconnect the bus line 16 from the supply capacitor 56 (more details in the following paragraphs). At this point the current pulled to ground by the first NFET 28 and the total capacitance of the first and second EMI suppression capacitors 24 and 44, will result in a linear ramp to ground. In one embodiment, the target fall time is 6 ns, the total capacitance of the first and second EMI suppression capacitors 24 and 44 is 40 pf, and the programmed current of the first NFET 28 is 13.5 mA.

At the slave IC 14 side, when the bus line 16 transitions from a low state into a high state within a telegram, the edge detection circuit 46 will activate the FRO 58 at a threshold $V_{TH}$ of about 50% of the voltage level of the master power supply VIO on the bus line 16. The FRO 58 provides a clock signal with 50% duty cycle. The fourth inverter 60 will go low and release the reset of the first and second DFFs 62 and 64. Consequently, on the first falling edge of the FRO 58, the combination of the first DFF 62, the second DFF 64, and the fourth NAND gate 66 is configured to provide the edge detection signal EDS with a low state. The edge detection signal EDS is generated 10 to 20 ns after the voltage level of the bus line 16 rises to 50% of the voltage level of the master power supply VIO.

The edge detection signal EDS will pass through the first MUX 68 to the inverted S input of the SR latch formed by the fifth and sixth NAND gates 70 and 72. When the edge detection signal EDS goes low, then the Q output of the SR latch formed by the fifth and sixth NAND gates 70 and 72 goes high. The fifth inverter 74 then drives the gate of the third PFET 50 low to turn on the third PFET 50. Herein, the third PFET 50 may be a moderately large FET. A width of the third PFET 50 is between 1.5 and 2.5 mm, and a length of the third PFET 50 is between 0.15 and 0.2 μm. The third PFET 50 may have an ON channel resistance between 1 and 3 ohms. When the third PFET 50 turns on, a fairly low RC charging time constant is formed by the ON channel resistance of the third PFET 50 and the supply capacitor 56. This allows the supply capacitor 56 to recover significant change from the bus line 16 on almost any time interval, in which the bus line 16 is in a high state. The supply capacitor 56 remains connected with the bus line 16 through the third PFET 50 with the low ON channel resistance as long as the bus line 16 remains in a high state.

When the bus line 16 transitions from a high state back to a low state, a controlled current is pulled from the bus line 16 to ground by the master IC 12. This current will result in a voltage across the third PFET 50, which is detected by the reverse current detection circuit 54. The reverse current detection circuit 54 is then configured to provide the current detection signal CDS, which is high, to the second input of the NOR gate 80. Consequently, the inverted R input of the SR latch formed by the fifth and sixth NAND gates 70 and 72 is pulled low by the NOR gate 80, and the Q output of the SR latch formed by the fifth and sixth NAND gates 70 and 72 will go low. The fifth inverter 74 inverts the Q output of the SR latch formed by the fifth and sixth NAND gates 70 and 72, and provides a high output to turn off the third PFET 50. The turned-off third PFET 50 releases the supply capacitor 56 from the bus line 16 to avoid losing excessive charge from the supply capacitor 56. As such, the voltage on the bus line can ramp down to zero. At this point, the slave IC 14 is waiting for the next low to high transition of the bus line to repeat the process.

In addition, when the master power supply VIO first applies to the bus line 16, the supply capacitor 56 in the slave IC 14 will begin at zero volts. The master IC 12 provides a current from the master power supply VIO through the first PFET 26 to the bus line 16. Initially, the diode 52 in the slave IC 14 provides a path to begin charging the supply capacitor 56. The POR circuit 76 of the digital control circuit 48 holds a low output until the slave supply voltage VDD provided by the supply capacitor 56 has risen to a voltage level that is sufficient to operate the control block 78. With the low output of the POR circuit 76, the first MUX 68 selects the "0" input that is tied to ground and passes this to the inverted S input of the SR latch formed by the fifth and sixth NAND gates 70 and 72. This causes the Q output of the S-R latch formed by the fifth and sixth NAND gates 70 and 72 to go high and the output of the fifth inverter 74 to go low. Consequently, the third PFET 50 is turned on and configured to provide a low resistance path from the bus line 16 to the supply capacitor 56.

Figure 3:
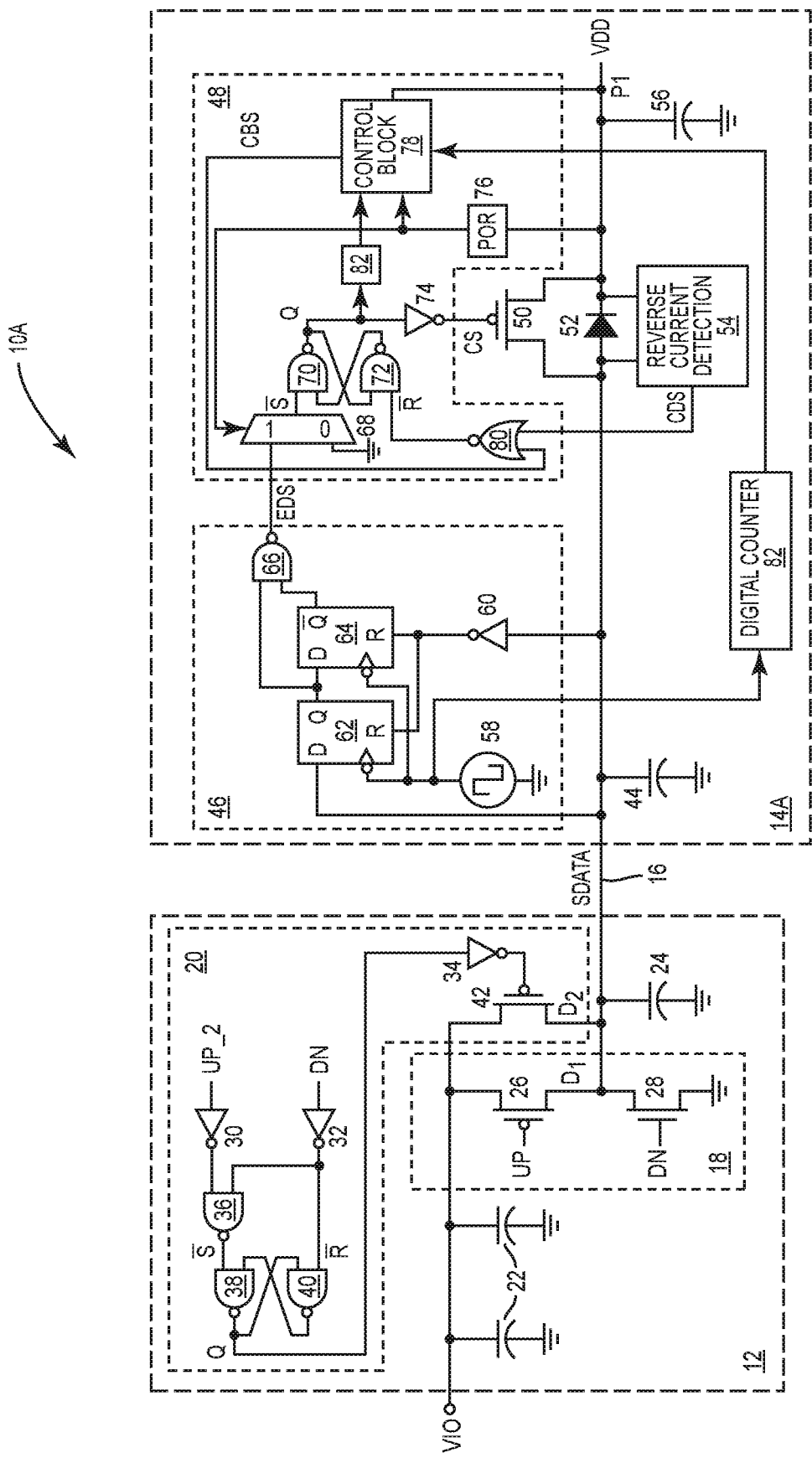
FIG. 3 illustrates an alternative bus interface system according to one embodiment of the present disclosure.

FIG. 3 illustrates an alternative bus interface system 10A according to one embodiment of the present disclosure. Compared to the bus interface system 10, the bus interface system 10A has a same master IC 12, but an alternative slave IC 14A. Herein, the slave IC 14A further includes a digital counter 82 coupled between the output of the FRO 58 and the control block 78. The digital counter 82 determines when to turn off the third PFET 50 and disconnect the bus line 16 from the supply capacitor 56 within a telegram.

FIGS. 4A-4D illustrate timing diagrams of the bus interface system 10A shown in FIG. 4 within a telegram. The digital counter 82 counts the pulse number of the FRO 58. Once the digital counter 82 reaches its predetermined count, the digital counter 82 is configured to force the control block 78 to generate a high-state output to the NOR gate 80 to turn off the third PFET 50. The time, at which the third PFET 50 is turned off, will occur before the bus line 16 transitions from a high state to a low state. In other words, the third PFET 50 will be turned off before the reverse current detection circuit 54 senses the reversed current. Notice that, if the third PFET 50 turns on outside of a telegram, then the third PFET 50 remains on and only turns off when the reverse current detection circuit 54 senses the reversed current through the third PFET 50.

In the bus interface system 10A, the turn-off delay encountered due to the response time of the reverse current detection circuit 54 is avoided during a telegram. This turn-off delay may adversely affect the desired pulse width modulation of the combined data signal SDATA. Outside of a telegram (ex. in idle times, there is no data signal transmitted along the bus line 16), the third PFET 50 must be ON to maintain power to the slave IC 14A. A start of a new telegram will be detected by the reverse current detection circuit 54, when the first falling edge of the voltage level on the bus line 16 (current pulled from the bus line 16 to ground through the first NFET 28) after a previous telegram has completed. Thus, the first falling edge at the start of a telegram will have an added turn-off delay due to the response time of the reverse current detection circuit 54, and all other falling edges of the voltage level on the bus line 16 during the telegram will not experience added turn-off delay. The turn-off delay has a negligible effect outside of the telegram as there is no PWM signal present.

Figure 5:
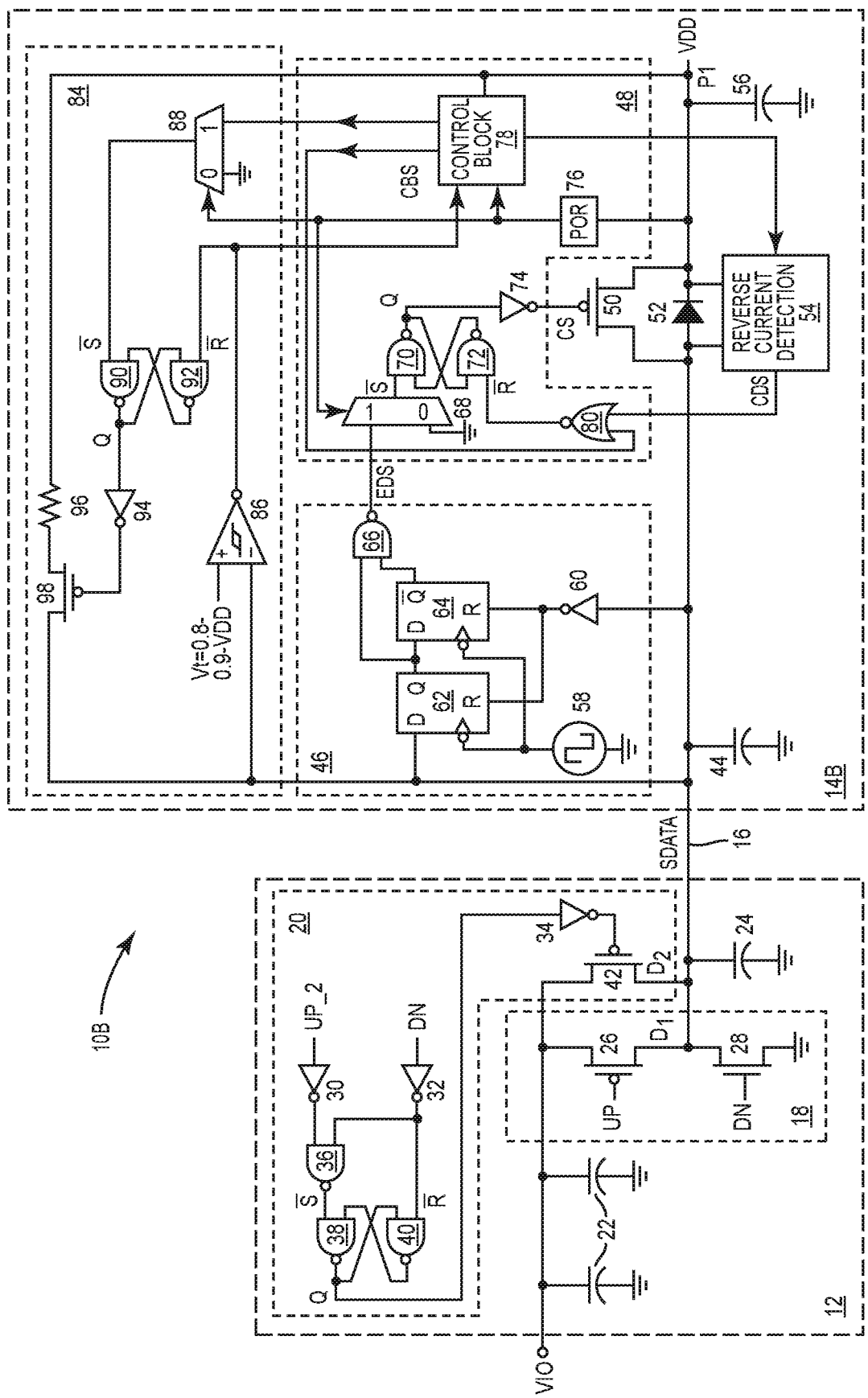
FIG. 5 illustrates an exemplary bus interface system with a reduced standby current according to one embodiment of the present disclosure.

In the bus interface system 10, the slave IC 14 must always provide power to the reverse current detection circuit 54, because in the idle times when the bus line 16 is high, the slave IC 14 must be ready to respond to the master IC 12 pulling current from the bus line 16 to ground to drive the bus line 16 low. Thus, a standby current, (ex. about 12 uA) will exist in the reverse current detection circuit 54, when the bus interface system 10 is in the idle times. However, for some applications, this level of the standby current is not acceptable. FIG. 5 illustrates an exemplary bus interface system 10B, in which the standby current is reduced or eliminated. Compared to the bus interface system 10, the bus interface system 10B has a same master IC 12, but an alternative slave IC 14B. The slave IC 14B further includes an auxiliary standby circuit 84, which includes a Schmitt trigger 86, a second MUX 88, a seventh NAND gate 90, an eighth NAND gate 92, a sixth inverter 94, a first resistor 96, and a fourth PFET 98. During the idle times, the auxiliary standby circuit 84 is configured to conduct a path from the supply capacitor 56 to the bus line 16, such that there is substantially no current in the reverse current detection circuit 54.

In detail, a first input of the Schmitt trigger 86 is coupled to the bus line 16, and an output of the Schmitt trigger 86 is coupled to the control block 78. The second MUX 88 has a "1" input coupled to the control block 78, a "0" input coupled to ground, and a switch control coupled to the output of the POR circuit 76. The seventh NAND gate 90 and the eighth NAND gate 92 form an SR latch, such that a first input of the seventh NAND gate 90 is an inverted S input of the SR latch, a first input of the eighth NAND gate 92 is an inverted R input of the SR latch, and an output of the seventh NAND gate 90 is a Q output of the SR latch. The inverted S input of the SR latch composed of the seventh and eighth NAND gates 90 and 92 is coupled to an output of the second MUX 88 and the inverted R input of the SR latch composed of the seventh and eighth NAND gates 90 and 92 is coupled to the output of the Schmitt trigger 86. In addition, the Q output of the SR latch composed of the seventh and eighth NAND gates 90 and 92 is couple to a gate of the fourth PFET 98 through the sixth inventor 94. A drain of the fourth PFET 98 is coupled to the bus line 16, and a source of the fourth PFET 98 is coupled to the supply capacitor 56 though the first resistor 96.

After the slave IC 14 enters the idle times, the control block 78 will pull its output to the NOR gate 80 high. This will reset the SR latch formed by the fifth and sixth NAND gates 70 and 72 and turn off the third PFET 50 through the fifth inverter 74. As such the path from the bus line to the supply capacitor 56 through the third PFET 50 is open. Meanwhile, the control block 78 will also disable the reverse current detection circuit 54 (Herein, the control block 78 is also coupled to the reverse current detection circuit 54) to eliminate the standby current. In addition, the control block 78 will pull the "1" input of the second MUX 88 low, which will set the SR latch formed by the seventh and eighth NAND gates 90 and 92. Consequently, the Q output of the SR latch formed by the seventh and eighth NAND gates 90 and 92 will go high and the output of the sixth inverter 94 will go low. The fourth PFET 98 will be turned on and conduct a path between the supply capacitor 56 and the bus line 16 within the idle times.

When the next telegram comes, the voltage level on the bus line 16 transitions from high to low (current pulled from the bus line 16 to ground through the first NFET 28). Once the voltage level on the bus line 16 drops to less than 0.8 to 0.9 times the slave supply voltage VDD provided by the supply capacitor 56, the output of the Schmitt trigger 86 will go low. Consequently, the Q output of the SR latch formed by the seventh and eighth NAND gates 90 and 92 will go low and the output of the sixth inverter 94 will go high. The fourth PFET 98 is turned off, so that there is no path for current pulled from the supply capacitor 56 to ground through the first NFET 28. The control block 78 will also respond to the output of the Schmitt trigger 86 going low by re-activating the reverse current detection circuit 54 and pulling the output to the NOR gate 80 low. Then, the bus interface system 10B operates the same as the bus interface system 10 for the coming telegram.

Figure 6:
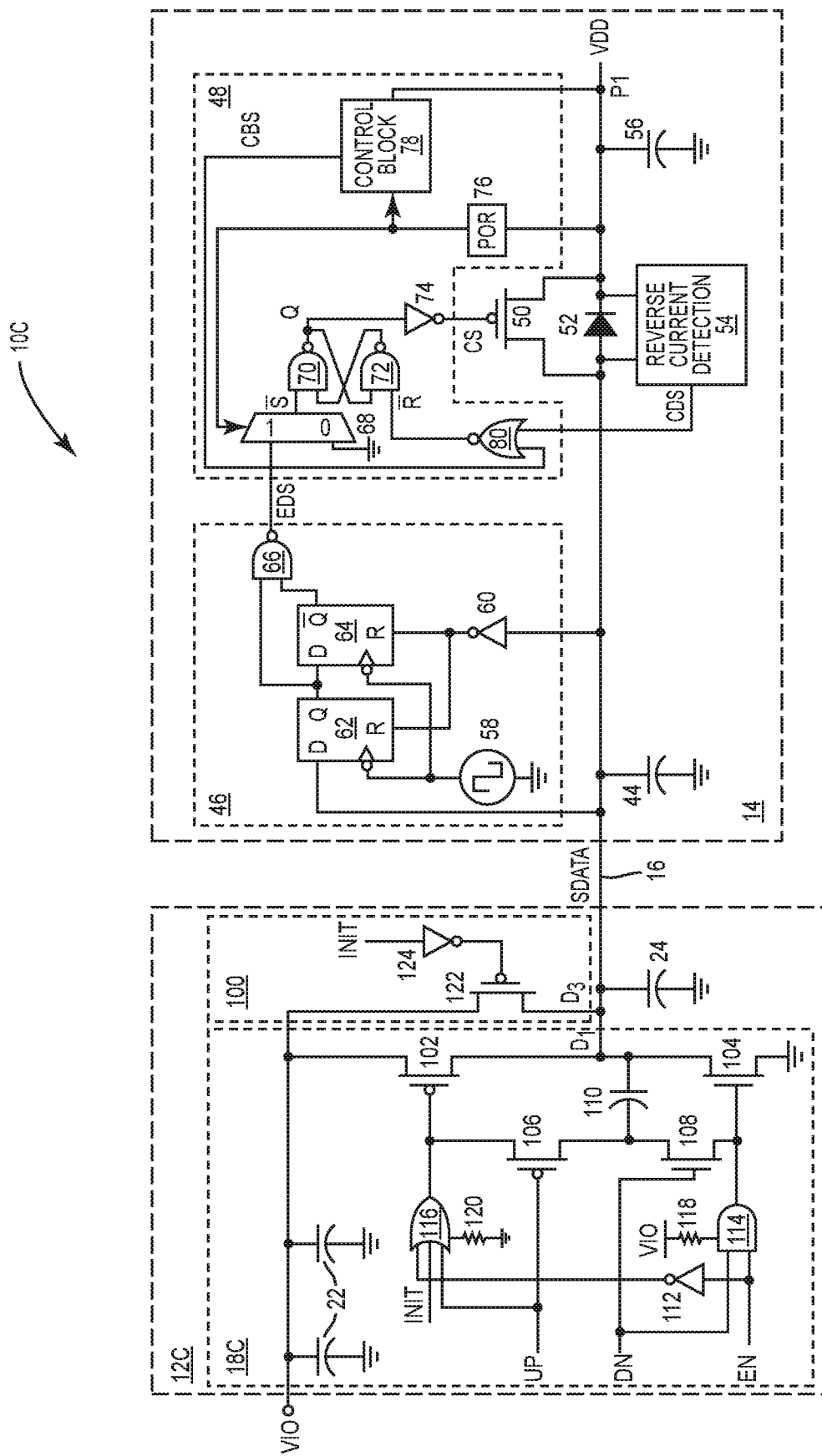
FIG. 6 illustrates an alternative bus interface system according to one embodiment of the present disclosure.

FIG. 6 illustrates an alternative bus interface system 10C according to one embodiment of the present disclosure. Compared to the bus interface system 10, the bus interface system 10C has a same slave IC 14, but an alternative master IC 12C. The alternative master IC 12C includes the shunt capacitors 22, the EMI suppression capacitors 24, an alternative data modulator 18C, and an initialization circuit 100. Herein, the data modulator 18C may be functioning as a constant slew rate driver. The constant slew rate refers to a substantially constant dV/dt (slew rate) at the joint point of the fifth PFET 102 and the second NFET 104 (the bus line 16). The data modulator 18C is coupled between the master power supply VIO and ground, configured to receive the UP input signal, the DN input signal, an EN enable signal, and an INIT initial signal, and configured to provide the first data signal D1 to the bus line 16. The initialization circuit 100 is coupled to the bus line 16 and active when the bus interface system 10C is initially started. The initialization circuit 100 is configured to receive the INIT initial signal and configured to provide an initial data signal D3 to the bus line 16. The combined data signal SDATA transmitted along the bus line 16 is based on the initial data signal D3 when the bus interface system 10C is initially started; while the combined data signal SDATA is based on the first data signal D1 from the alternative data modulator 18C when the bus interface system 10C is in normal operation.

In one embodiment, the data modulator 18C may be formed by a fifth PFET 102, a second NFET 104, a sixth PFET 106, a third NFET 108, a feedback capacitor 110, a seventh inverter 112, an AND gate 114, an OR gate 116, a second resistor 118, and a third resistor 120. The fifth PFET 102 and the second NFET 104 are coupled in series between the master power supply VIO and ground. A source of the fifth PFET 102 is coupled to the master power supply VIO, a drain of the fifth PFET 102 is coupled to a drain of the second NFET 104, and a source of the second NFET 104 is coupled to ground. The bus line 16 is coupled to a joint point between the drain of the fifth PFET 102 and the drain of the second NFET 104, at which the first data signal D1 is provided. Herein, the fifth PFET 102 and the second NFET 104 are moderately large FETs. A width of the fifth PFET 102 is between 8 and 12 mm, and a length of the fifth PFET 102 is between 0.15 and 0.2 µm. A width of the second NFET 104 is between 1.5 and 2.5 mm, and a length of the second NFET 104 is between 0.3 and 0.4 µm.

In addition, the sixth PFET 106 and the third NFET 108 are coupled between a gate of the fifth PFET 102 and a gate of the second NFET 104. A source of the sixth PFET 106 is coupled to the gate of the fifth PFET 102, a drain of the sixth PFET 106 is coupled to a drain of the third NFET 108, and a source of the third NFET 108 is coupled to the gate of the second NFET 104. The feedback capacitor 110 is coupled between the joint point of the fifth PFET 102 and the second NFET 104 and a joint point of the sixth PFET 106 and the third NFET 108. A gate of the sixth PFET 106 is configured to receive the UP input signal, and a gate of the third NFET 108 is configured to receive the DN input signal. Herein, the sixth PFET 106 and the third NFET 108 are small FETs. A width of the sixth PFET 106 is between 30 and 50 µm, and a length of the sixth PFET 106 is between 0.15 and 0.2 µm. A width of the third NFET 108 is between 15 and 25 µm, and a length of the third NFET 108 is between 0.2 and 0.25 µm.

Further, the DN input signal and the EN enable signal are received at inputs of the AND gate 114, and an output of the AND gate 114 is coupled to the gate of the second NFET 104. The AND gate 114 is also coupled to the master power supply VIO through a second resistor 118 to form a current path. The UP input signal, an inverted EN enable signal, and the INIT initial signal are received at inputs of the OR gate 116, and an output of the OR gate 116 is coupled to the gate of the fifth PFET 102. The OR gate 116 is also coupled to ground through a third resistor 120 to form another current path.

The initialization circuit 100 may be formed by a seventh PFET 122 and an eighth inverter 124. The master power supply VIO is coupled to a source of the seventh PFET 122, and the bus line 16 is coupled to a drain of seventh PFET 122, at which the third data signal D3 is provided. The INIT initial signal is coupled to a gate of the seventh PFET 122 through the eighth inverter 124. Herein, the seventh PFET 122 is a moderate FET. A width of the seventh PFET 122 is between 480 and 550 µm, and a length of the seventh PFET 122 is between 0.3 and 0.4 µm. In the initialization circuit 100, the seventh PFET 122 and the eighth inverter 124 may be replaced by a NFET, which is configured to receive the INIT initial signal.

When the bus interface system 10C is initially started, the INIT initial signal is set high to activate the initialization circuit 100. As such, the initialization circuit 100 is configured to charge up the supply capacitor 56 initially. The INIT initial signal will be high for about 200 µs and then set low for the remaining operations. After the initial period, when the bus line 16 transitions from a low state into a high state within a telegram, the master IC 12C will set the DN input signal low to turn off the third NFET 108 and the second NFET 104, and will set the UP input signal low to turn on the sixth PFET 106. Herein, when the bus interface system 10C starts to operate, the EN enable signal is always high until the bus interface system 10C is off. As such, setting the UP input signal low will also turn on the fifth PFET 102. When the bus line 16 moves from a high state to a low state, the master IC 12C will set the DN input signal and the UP input signal back to high. When the DN input signal goes high, the third NFET 108 and the second NFET 104 are turned on. When the UP input signal goes high, the sixth PFET 106 and the fifth PFET 102 are turned off.

The feedback capacitor 110 is configured to limit current swings at the joint point of the fifth PFET 102 and the second NFET 104. The sixth PFET 106 and the third NFET 108 serve as a switching element to selectively couple the feedback capacitor 110 either to the gate of the fifth PFET 102 or the gate of the second NFET 104. Since the gate of the fifth PFET 102 or the second NFET 104 will have an essentially constant voltage during the transition time in order to obtain the constant dV/dt (slew rate) at the joint point of the fifth PFET 102 and the second NFET 104, the second resistor 118/the third resistor 120 may function as a current source. A voltage across the second resistor 118/third resistor 120 and thus the current through the second resistor 118/third resistor 120 are essentially constant. When the second NFET 104 and the third NFET 108 are off, a current path (with current 1) will be formed from the feedback capacitor 110 through the sixth PFET 106 and the third resistor 120 to ground. When the fifth PFET 102 and the sixth PFET 106 are off, a current path (with current 2) will be formed from the master power supply VIO through the second resistor 118 and the third NFET 108 back to the feedback capacitor 110. The current 1/the current 2 then flows through the feedback capacitor 110 and forces the dV/dt at the joint point of the fifth PFET 102 and the second NFET 104 to be constant.

The second and third resistors 118 and 120 will not provide standby current to the data modulator 18C. Instead, the second and third resistors 118 and 120 will only draw current when the UP input signal and/or DN input signal is transitioning and has zero turn on time.

Those skilled in the art will recognize improvements and modifications to the preferred embodiments of the present disclosure. All such improvements and modifications are considered within the scope of the concepts disclosed herein and the claims that follow.

What is claimed is:

1. A bus interface system, comprising:
   a bus line having a low state and a high state;
   master integrated circuitry (IC) coupled to the bus line, wherein the master IC is configured to generate a data signal and transmit the data signal along the bus line, wherein:
      the data signal is a pulse width modulation (PWM) waveform having a high level and a low level; and
      the bus line is in the high state when the data signal is at the high level, and the bus line is in the low state when the data signal is at the low level; and
   slave IC coupled to the bus line so as to receive the data signal from the master IC and comprising an edge detection circuit coupled to the bus line, a digital control circuit, a supply capacitor, and a field effect transistor (FET) coupled to the supply capacitor and the bus line, wherein:
      the edge detection circuit is configured to provide an edge detection signal, which is based on a voltage level of the bus line, to the digital control circuit;
      the digital control circuit is configured to provide a control signal, which is at least based on the edge detection signal, to open or close the FET;
      when the bus line is in the low state, the supply capacitor is isolated from the bus line; and
      when the bus line is in the high state, the supply capacitor is configured to extract and store power from the data signal on the bus line, and provide a supply voltage to the slave IC.

2. The bus interface system of claim 1 wherein the slave IC further comprises a reverse current detection circuit wherein:
   the reverse current detection circuit is coupled to the bus line and configured to provide a current detection signal, which is based on current direction on the bus line, to the digital control circuit; and
   a the digital control circuit is configured to provide the control signal, which is based on the edge detection signal and the current detection signal, to open or close the FET.

3. The bus interface system of claim 2 wherein the FET is a p-type FET (PFET) with an ON channel resistance between 1 and 3 ohms.

4. The bus interface system of claim 2 wherein:
   when the bus line transitions from the low state to the high state, the digital control circuit utilizes the edge detection signal from the edge detection circuit to turn on the FET; and
   when the bus line transitions from the high state to the low state, the digital control circuit utilizes the current detection signal from the reverse current detection circuit to turn off the FET.

5. The bus interface system of claim 2 wherein:
   when the bus line is in the low state, the FET is open to isolate the supply capacitor from the bus line; and
   when the bus line is in the high state, the FET is closed to provide a charging path between the bus line and the supply capacitor.

6. The bus interface system of claim 2 wherein the slave IC further comprises at least one electromagnetic interference (EMI) suppression capacitor, which is coupled in shunt with respect to the bus line to remove voltage spikes from the data signal on the bus line.

7. The bus interface system of claim 6 wherein the at least one EMI suppression capacitor has a smaller capacitance than the supply capacitor.

8. The bus interface system of claim 2 wherein the slave IC further comprises a diode, wherein an anode of the diode is coupled to the bus line and a cathode of the diode is coupled to the supply capacitor.

9. The bus interface system of claim 1 wherein:
the digital control circuit comprises a digital counter and a control block, wherein the control block is configured to provide a control block signal that responds to a counting number of the digital counter; and
the digital control circuit is configured to provide the control signal to open or close the FET, wherein the control signal is based on the edge detection signal and the control block signal.

10. The bus interface system of claim 9 wherein:
when the bus line transitions from the low state to the high state, the digital control circuit utilizes the edge detection signal from the edge detection circuit to turn on the FET; and
when the counting number of the digital counter reaches a threshold, the digital control circuit utilizes the control block signal to turn off the FET.

11. The bus interface system of claim 10 wherein the counting number of the digital counter reaches the threshold before the bus line transitions from the high state to the low state.

12. The bus interface system of claim 9 wherein:
when the bus line is in the low state, the FET is open to isolate the supply capacitor from the bus line; and
when the bus line is in the high state, the FET is closed to provide a charging path between the bus line and the supply capacitor.

13. The bus interface system of claim 9 wherein the slave IC further comprises a reverse current detection circuit, wherein:
the reverse current detection circuit is coupled to the bus line; and
the reverse current detection circuit is configured to provide a current detection signal, which is based on current direction on the bus line, to the digital control circuit.

14. The bus interface system of claim 13 wherein when the slave IC transitions from an idle mode to a telegram mode, the digital control circuit utilizes the current detection signal from the reverse current detection circuit to turn off the FET.

15. The bus interface system of claim 2 wherein the slave IC further comprises an auxiliary standby circuit, which is configured to provide an auxiliary path between the supply capacitor and the bus line.

16. The bus interface system of claim 15 wherein:
when the slave IC is in a telegram mode, the digital control circuit is configured to activate the reverse current detection circuit and disable the auxiliary standby circuit; and
when the slave IC is in an idle mode, the digital control circuit is configured to disable the reverse current detection circuit and activate the auxiliary standby circuit.

17. The bus interface system of claim 1 wherein the master IC comprises a data modulator and a switch circuit wherein:
the data modulator is coupled between a power supply and ground and configured to provide a first path from the power supply to the bus line;
the switch circuit is coupled between the power supply and the bus line, and configured to form a second path between the power supply and the bus line, wherein the second path has a lower impedance than the first path; and
a combination of the data modulator and the switch circuit is configured to provide the data signal to the bus line.

18. The bus interface system of claim 17 wherein the master IC further comprises at least one EMI suppression capacitor, which is coupled in shunt with respect to the bus line to remove voltage spikes from the data signal on the bus line.

19. The bus interface system of claim 17 wherein the master IC further comprises at least one shunt capacitor, which is coupled in shunt between the power supply and the data modulator to reduce ripple variations.

20. A bus interface system comprising:
a bus line having a low state and a high state;
master integrated circuitry (IC) coupled to the bus line and comprising a data modulator and a switch circuit, wherein:
the data modulator is coupled between a power supply and ground and configured to provide a first path from the power supply to the bus line;
the switch circuit is configured to form a second path between the power supply and the bus line and comprises a FET, wherein a drain of the FET and a source of the FET are coupled to the bus line and the power supply, respectively, and the FET has an ON channel resistance between 0.2 and 0.5 ohms;
the second path has a lower impedance than the first path;
a combination of the data modulator and the switch circuit is configured to provide a data signal to the bus line, wherein the data signal is a pulse width modulation (PWM) waveform having a high level and a low level; and
the bus line is in the high state when the data signal is at the high level, and the bus line is in the low state when the data signal is at the low level; and
slave IC coupled to the bus line so as to receive the data signal from the master IC and comprising a supply capacitor, wherein:
when the bus line is in the low state, the supply capacitor is isolated from the bus line; and
when the bus line is in the high state, the supply capacitor is configured to extract and store power from the data signal on the bus line, and provide a supply voltage to the slave IC.

21. A bus interface system comprising:
a bus line having a low state and a high state;
master integrated circuitry (IC) coupled to the bus line and comprising a data modulator, wherein:
the data modulator is coupled between a power supply and ground and configured to provide a data signal to the bus line; wherein the data signal is a pulse width modulation (PWM) waveform having a high level and a low level;
the bus line is in the high state when the data signal is at the high level, and the bus line is in the low state when the data signal is at the low level; and
a slew rate dV/dt on the bus line is constant, when the bus line transitions from the low state to the high state or when the bus line transitions from the high state to the low state; and slave IC coupled to the bus line so as to receive the data signal from the master IC and comprising a supply capacitor, wherein:
- when the bus line is in the low state, the supply capacitor is isolated from the bus line; and
- when the bus line is in the high state, the supply capacitor is configured to extract and store power from the data signal on the bus line, and provide a supply voltage to the slave IC.

* * * * *

UNITED STATES PATENT AND TRADEMARK OFFICE
CERTIFICATE OF CORRECTION

PATENT NO. : 10,558,607 B2
APPLICATION NO. : 15/886209
DATED : February 11, 2020
INVENTOR(S) : Christopher Truong Ngo et al.

Page 1 of 1

It is certified that error appears in the above-identified patent and that said Letters Patent is hereby corrected as shown below:

In the Specification
In Column 5, Line 65, replace "1 of" with --1 nf--.

In the Claims
In Column 14, Line 43, Claim 1, replace "a the digital control circuit" with --the digital control circuit--.

Signed and Sealed this
Thirty-first Day of March, 2020

Andrei Iancu
*Director of the United States Patent and Trademark Office*